United States Patent [19]

Murakami

[11] Patent Number: 4,764,698
[45] Date of Patent: Aug. 16, 1988

[54] A.C. ELECTRIC MOTORS HAVING A STATOR FORMING ORTHOGONAL MAGNETIC PATHS

[75] Inventor: Koichi Murakami, Sendai, Japan

[73] Assignee: Tohoku Metal Industries, Ltd., Miyagi, Japan

[21] Appl. No.: 818,822

[22] Filed: Mar. 24, 1986

Related U.S. Application Data

[62] Division of Ser. No. 461,103, Jan. 26, 1983.

[51] Int. Cl.[4] .......................... H02K 1/12; H02K 3/00
[52] U.S. Cl. ...................................... 310/72; 310/152; 310/254; 318/696
[58] Field of Search ..................... 310/68–72, 310/49 R, 152, 162, 164, 254; 318/696

[56] References Cited

U.S. PATENT DOCUMENTS 3,716,734  2/1973  Fam .......................................... 310/72
4,185,217  1/1980  Grosu ................................. 310/72 X Primary Examiner—Patrick R. Salce
Assistant Examiner—D. L. Rebsch
Attorney, Agent, or Firm—Roberts, Spiecens & Cohen

[57] ABSTRACT

A stator of an A.C. electric motor includes a magnetic core comprising a magnetic ring member and two "U"-shaped magnetic members connected to the ring member. The two "U"-shaped magnetic members hold the ring member therebetween and are angularly spaced from one another around the central axis of the ring member. A primary winding is wound on one of the two "U"-shaped members and a secondary winding is wound on the other "U"-shaped member. The secondary winding is short-circuited by a capacitor. When A.C. voltage is applied to the primary winding, A.C. voltage is induced on the secondary winding at a certain value, or more than the primary voltage. A rotary flux is formed in the ring member by magnetic fluxes induced by primary and secondary A.C. currents. Accordingly, a cage rotor or magnet rotor which is rotatably disposed in the ring member can be rotated.

5 Claims, 17 Drawing Sheets

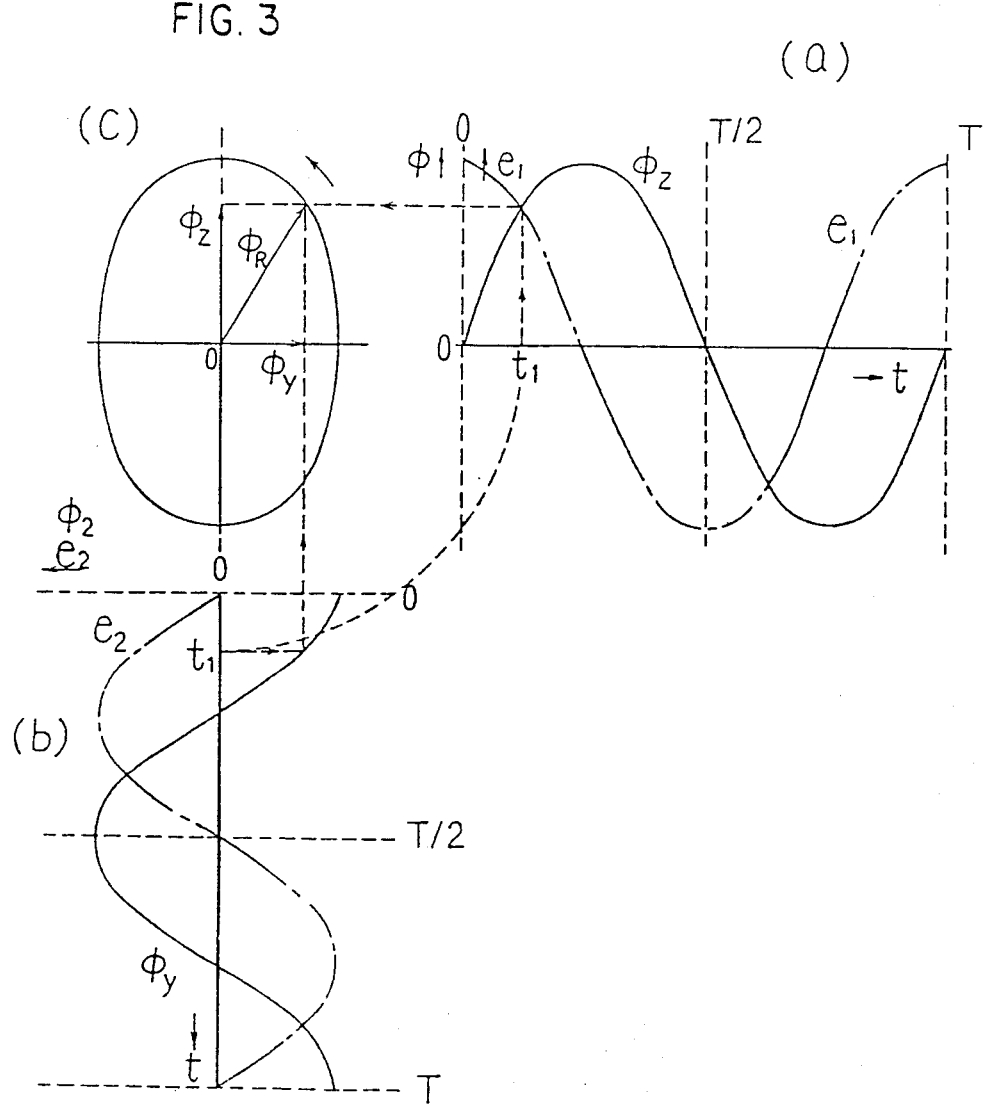

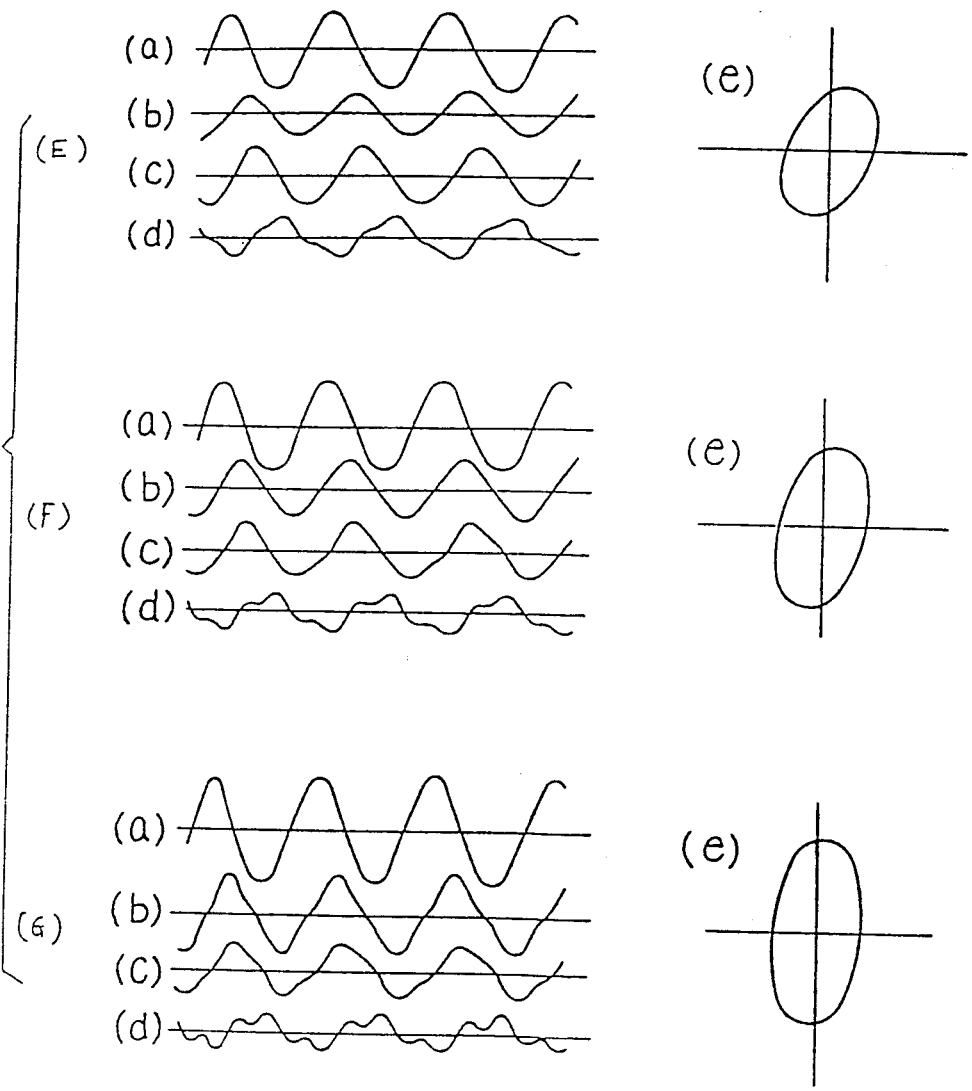

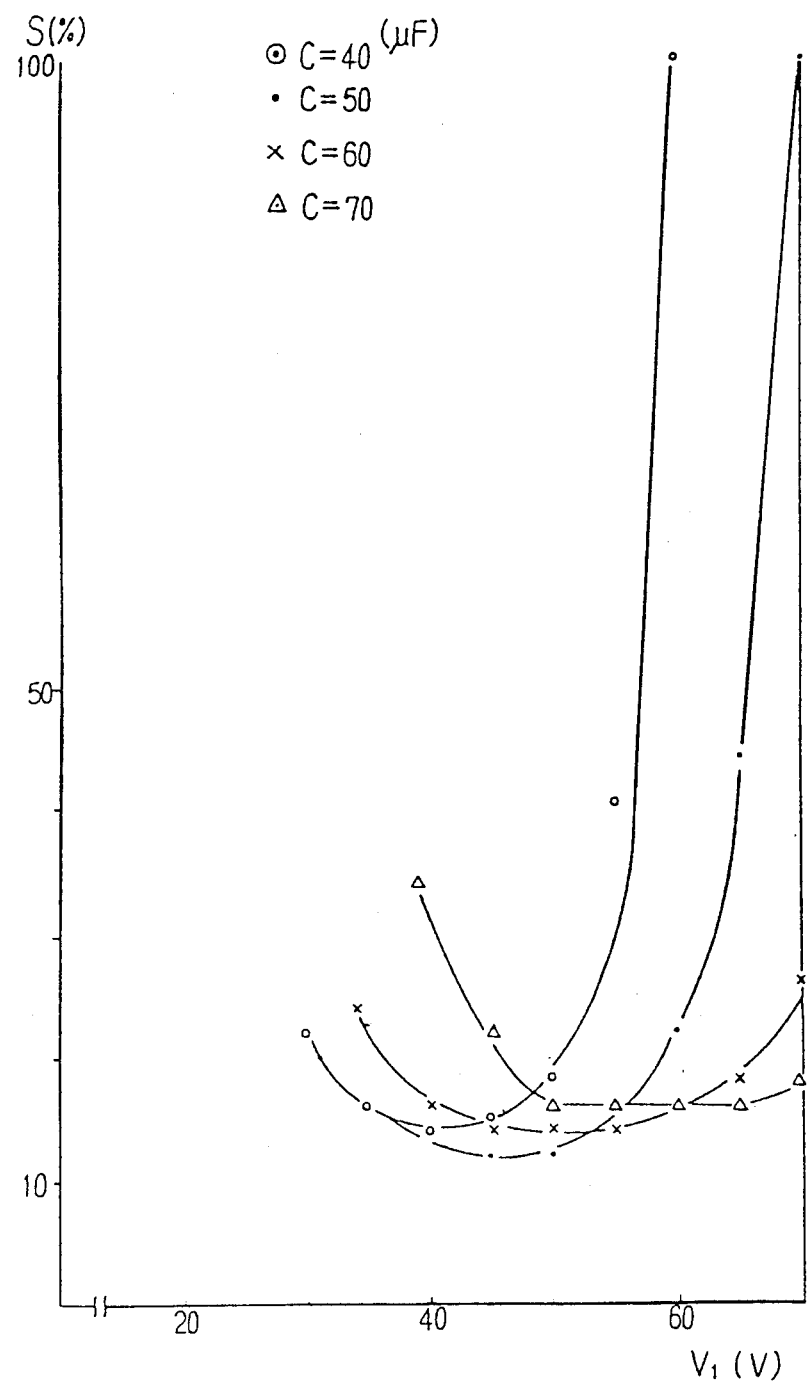

- • $E_1 = E_2 = 100(V)$
- ○ 110(V)
- ▲ 120(V)
- ▲ 130(V)
- □ 140(V)

A.C. ELECTRIC MOTORS HAVING A STATOR FORMING ORTHOGONAL MAGNETIC PATHS

This is a divisional of application Ser. No. 461,103, filed 1/26/83.

BACKGROUND OF THE INVENTION

This invention relates to A.C. electric motors and, in particular, to improvements of stators of A.C. electric motors.

In known A.C. electric motors such as induction motors and synchronous motors, a stator must be formed with slots in its cylindrical surface confronting the rotary surface of a rotor with a magnetic gap therebetween, in which slots armature windings are disposed and electrically insulated. Because poor formation of slots and poor disposition of windings cause unevenness in rotation of the motor, much care and long time are disadvantageously taken to produce the stator.

Rotating speed of the known A.C. electric motor can be controlled by adjusting the applied A.C. voltage, but this means that the rotating speed changes by variations of the applied A.C. voltage.

SUMMARY OF THE INVENTION

Therefore, a main object of this invention is to provide an A.C. motor having a stator which is simple in construction and production.

Another object of this invention is to provide an A.C. motor having a stator wherein a rotary magnetic field is generated by a novel principle in order to achieve the above described object.

Still another object of this invention is to provide an A.C. motor the rotating speed of which is maintained constant even if the applied voltage is varied.

Yet another object of this invention is to provide an A.C. motor having little unevenness in rotation.

According to this invention, an A.C. electric motor comprises a stator including a magnetic body having a penetrated circular bore. First magnetic yoke means are connected to the magnetic body so that its opposite ends may be connected to one axial end surface of the magnetic body at the positions of the opposite end of a first diameter of the circular bore. Second magnetic yoke means are connected to the magnetic body so that its opposite ends may be connected to the other axial end surface of the magnetic body at the positions of the opposite ends of a second diameter angularly spaced from the first diameter. First winding means are wound on the first magnetic yoke means and have first electric terminals to which an A.C. voltage source should be connected. Second winding means are wound on the second magnetic yoke means and have second electric terminals. Capacitor means are connected to the second electric terminals. Rotor means are disposed in the circular bore of the magnetic body with its rotary shaft aligned with the center axis of the circular bore.

A cage rotor or magnet rotor may be used as the rotor means.

Further objects, features and other aspects of this invention will be understood from the following description of preferred embodiments of this invention with reference to the accompanying drawings.

BRIEF DESCRIPTION OF THE DRAWINGS

In the accompanying drawings:

FIGS. 2 and 3 are diagrams for explaining the principle of generation of a rotating magnetic field in the apparatus according to the present invention, FIG. 2 being a diagram showing the case where the input and output voltages are identical to each other, FIG. 3 being a diagram showing the case where the input and output voltages are different from each other;

FIG. 7 is a diagram showing the relations between the input voltage and the slip for various values of the capacitance of the resonant capacitor;

DETAILED DESCRIPTION OF PREFERRED EMBODIMENTS

This invention is based on my following novel knowledge:

In a magnetic core including a magnetic ring member, a first "U"-shaped magnetic member connected to an axial end of the ring member, and a second "U"-shaped magnetic member connected to the other axial end of the ring member at an angular position different from the first magnetic member, a certain oscillation phenomenon may be observed that, upon applying A.C. voltage to a primary winding wound on the first "U"-shaped magnetic member, an A.C. voltage at a secondary winding wound on the second "U"-shaped magnetic member and short-circuited by a capacitor is not at a magnitude lower than primary voltage but is at an increased magnitude with respect to the primary voltage. The secondary voltage is observed to be different from the primary voltage by $\pi/2$ in phase. The oscillation will be referred to as parametric oscillation. This means that the resultant flux of the magnetic flux induced by the primary current and another magnetic flux induced by the secondary current composed at the ring member rotates.

Figure 1:
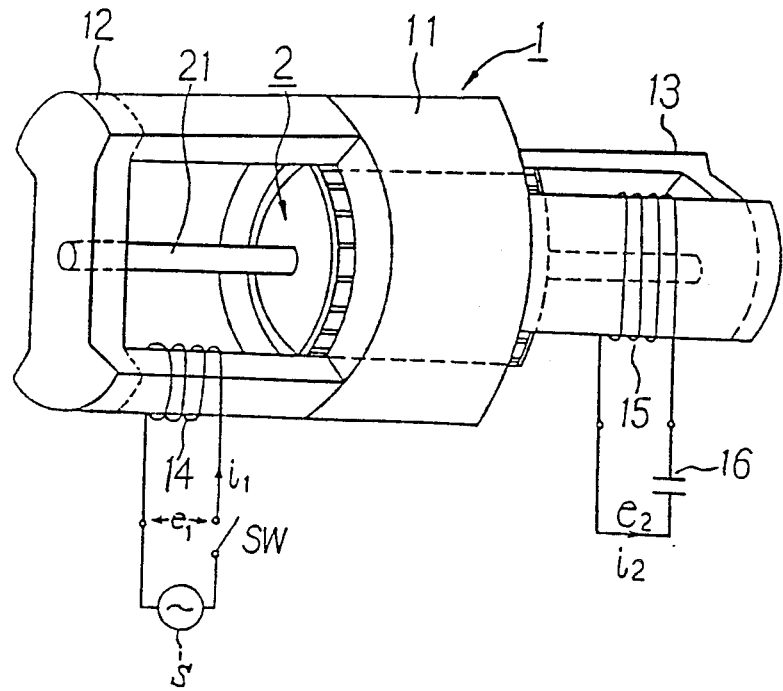
FIG. 1 is a perspective view showing the structure of one preferred embodiment of the present invention.

Referring now to FIG. 1, an A.C. electric motor according to one preferred embodiment of the present invention comprises a stator 1 including a ring-shaped member 11 made of magnetic material, and magnetic yokes 12 and 13 disposed on the axially opposite sides of the ring-shaped member 11. The magnetic yoke 12 is formed in a U-shape and its respective ends are joined to one end surface of the ring-shaped member 11 at the positions of the opposite ends of one diameter of the member 11. The other magnetic yoke 13 is also formed in a U-shape and its respective ends are joined to the other end surface of the ring-shaped member at the positions deflected by 90° from the joining positions of the magnetic yoke 12. Around the magnetic yoke 12 is wound a winding 14 to be supplied with an A.C. voltage, while another winding 15 is wound around the magnetic yoke 13, and a capacitor 16 is connected across the winding 15.

In the bore of the ring-shaped member 11 is positioned a rotor 2, and the opposite ends of a rotary shaft 21 of the rotor 2 are rotatably supported by the magnetic yokes 12 and 13 via bearings (not shown).

Assuming now that an A.C. voltage is applied from an A.C. power supply S to the winding 14 by closing a power supply switch SW and a power supply voltage $e_1$ is increased, then parametric oscillation would arise abruptly at a certain value of the power supply voltage $e_1$, and consequently, a voltage $e_2$ that is 90° out of phase with respect to the input voltage $e_1$ and approximately equal in magnitude to the input voltage $e_1$, is induced in the other winding 15. At this moment, a rotating magnetic field is generated in the ring-shaped member 11, and thus the rotor 2 rotates.

In the following, the principle of rotation of the rotor will be explained with respect to the case where a cage rotor is employed as the rotor 2.

Figure 2:
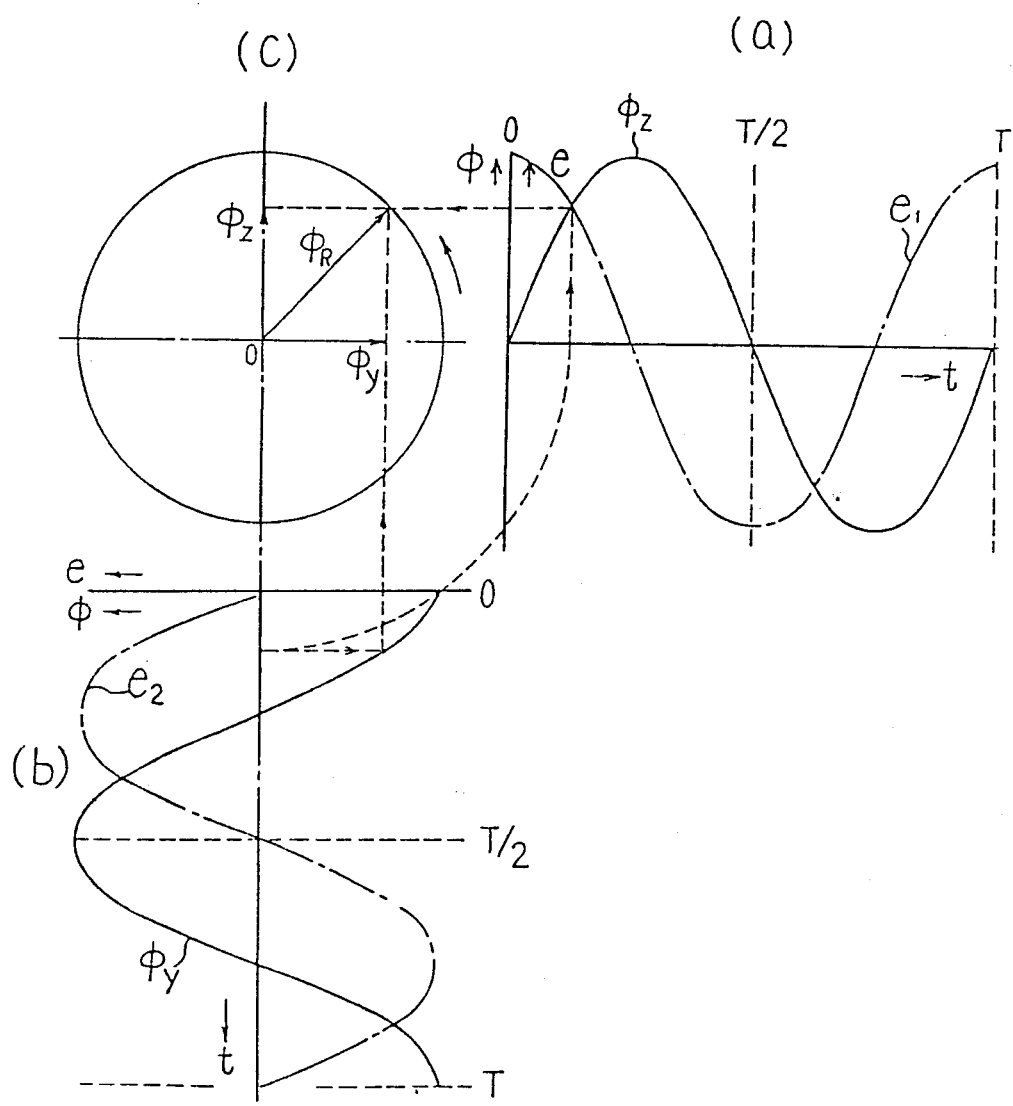

With reference to FIG. 2, a magnetic flux $\Phi_z$ generated by the input voltage $e_1$ will vary along a time axis as shown at (a) in FIG. 2. On the other hand, a magnetic flux $\Phi_y$ generated by the voltage $e_2$ induced in the winding 15 will vary along a time axis as shown at (b) in FIG. 2. It is to be noted that at (a) and (b) are also shown the variations of the voltages $e_1$ and $e_2$, respectively, by dash-dot lines. On the other hand, since the magnetic yokes 12 and 13 are joined to the ring-shaped member 11 at angles from each other so as to be displaced by 90°, the resultant magnetic flux $\Phi_R$ in the ring-shaped member formed from both magnetic fluxes $\Phi_z$ and $\Phi_y$ is as shown in FIG. 2(c), rotates in the counterclockwise direction as time elapses. In other words, a rotating magnetic field is generated in the ring-shaped member 11, and accordingly, the rotor 2 rotates with a slip S.

While the magnitude of the rotating magnetic field $\Phi_R$ is not varied with time as shown in FIG. 2(c) when the primary voltage $e_1$ is equal to the secondary voltage $e_2$, if the primary voltage $e_1$ is larger than the secondary voltage $e_2$, the magnitude $\Phi_R$ would change with time as shown in FIG. 3.

In general, the magnetic fluxes $\Phi_y$ and $\Phi_z$ produce a complex three-dimensional distribution within the ring-shaped member 11, and so, it is difficult to maintain the magnitude of the rotating magnetic field $\Phi$ strictly constant. However, according to results of experiments, it could be made approximately constant to obtain a substantially circular locus as shown in FIG. 2(c).

It is to be noted that if the input voltage $e_1$ is further increased, the parametric oscillation will cease at a certain voltage value, but the rotor 2 continues to rotate. In this case, the motor is operating as a single-phase induction motor excited only by the input winding 14.

Now description will be made of preferred embodiments of the A.C. electric motor according to the present invention.

Figure 4:
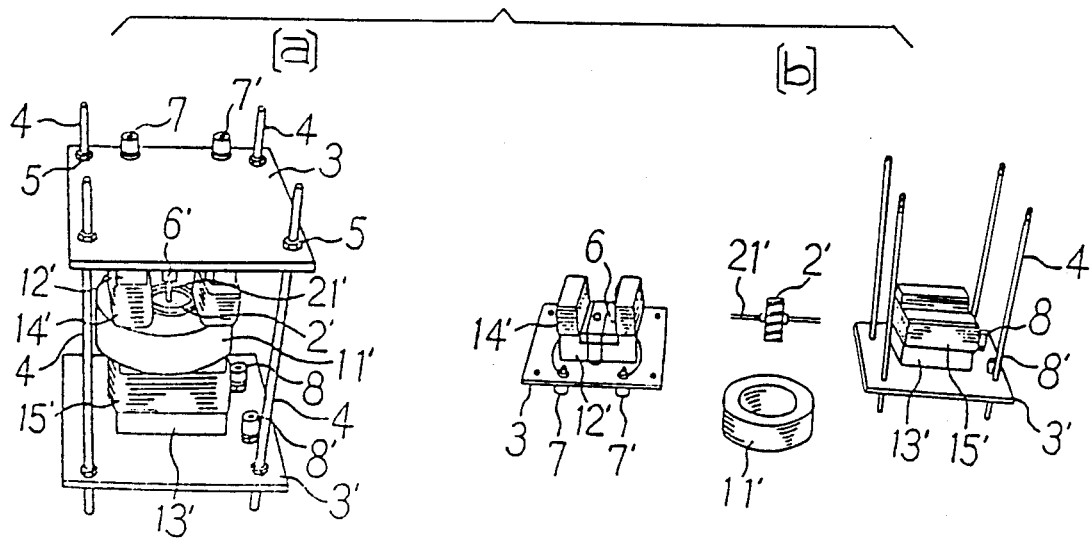
FIG. 4 is a view showing the structure of one preferred embodiment of the electric motor according to the present invention, a perspective view being shown at (a), and an exploded perspective view being shown at (b)

Embodiment 1:

FIG. 4 is a schematic perspective view showing a structure of an electric motor used in experiments, in which a Mn-Zn series ferrite ring was used as a ring member 11', commercially available cut cores (0.35 mm in thickness) made of Fe-Si series alloy were used as magnetic yokes 12' and 13', and 500 turns of wire were wound around the respective yokes as windings 14' and 15', respectively. A cage rotor for use in an induction motor was used as a rotor 2'. The magnetic yokes 12' and 13' made of cut cores were fixedly placed on bakelite plates 3 and 3', respectively, the ring member 11' was placed on one cut core 13', the rotor 2' was disposed within the ring member, the cut core 12' was placed on the ring member 11' at an in angle of 90° with repsect to the cut core 13', connecting rods 4 were penetrated through the both bakelite plates, nuts 5 were threadedly engaged with the respective connecting rods 4 to fix the entire assembly, and thus the electric motor was built. With regard to the support for the rotary shaft of the rotor 2', fixing plates 6 and 6' containing bearings therein were respectively disposed on the inner surfaces of the cut cores 12' and 13', and the opposite ends of the rotary shaft 21' of the rotor 2' were made to be supported by the respective bearings.

In addition, on the bakelite plates 3 and 3' are provided terminal fittings 7, 7' and 8, 8' connected to the windings 14' and 15', respectively.

Between the terminals 8 and 8', to which the winding 15' was connected, was connected a capacitor having a capacitance of 500 μF as a resonant capacitor (16 in FIG. 1), and an A.C. power supply of 50 Hz in frequency (also the same in the following) was connected to the terminals 7 and 7' to which the winding 14' was connected. A current I, flowing through the winding 14' (hereinafter called input current), a current I2 flowing through the winding 15' (this being an induced current and hence hereinafter called output current) a voltage generated across the winding 15' (this being an induced voltage and hence hereinafter called output voltage) $E_2$ and a rotational speed N (r.p.m.) of the rotor 2' were measured while the power supply voltage $E_1$ was varied.

Figure 5:
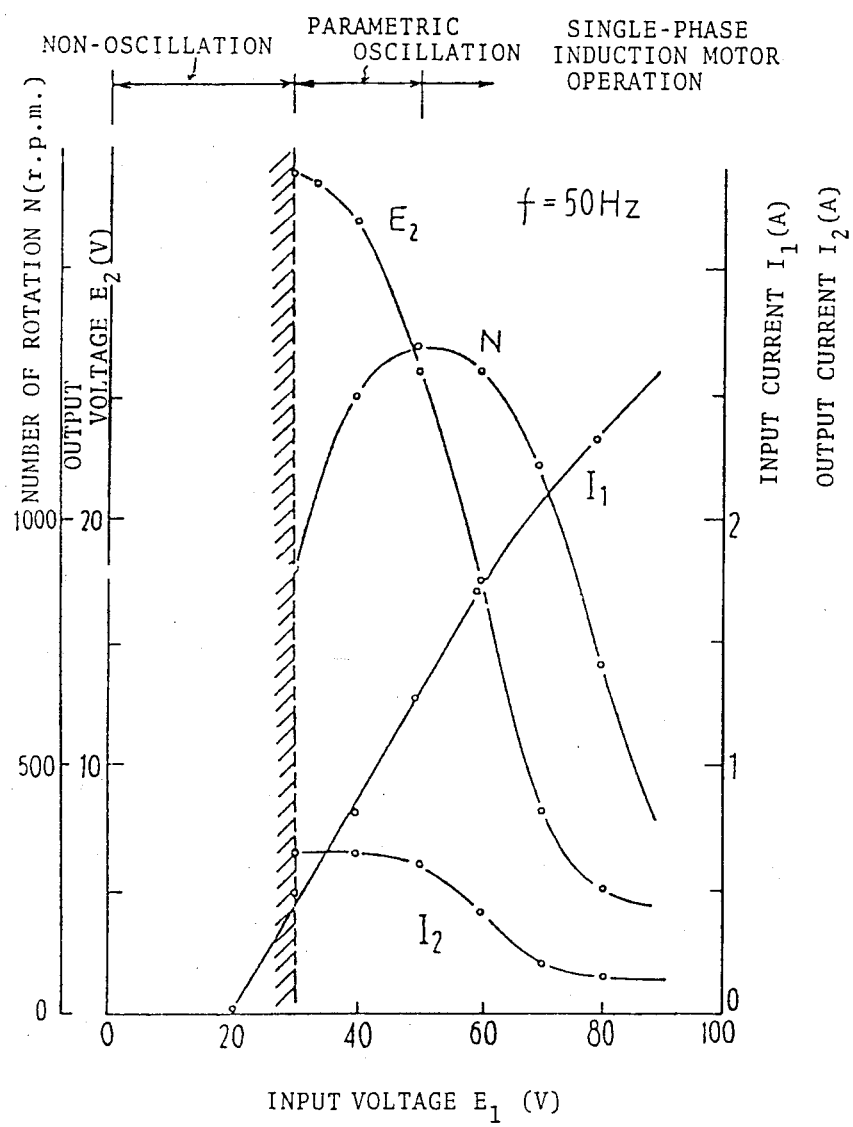
FIG. 5 is a diagram showing the relations between the input voltage of the electric motor in FIG. 4 and the rotational speed, output voltage, input current and output current, respectively.

As shown in FIG. 5, when the input voltage $E_1$ reaches 30 V, parametric oscillation arises. Then the output voltage $E_2$ becomes 34 V, and at the same time the rotor 2' begins to rotate at 1300 r.p.m. As the input voltage $E_1$ is further raised, the output voltage $E_2$ decreases, but the rotational speed N increases. When the input voltage $E_1$ becomes about 50 V, the parametric oscillation ceases. However, it is seen that since the excitation through the input winding 14' becomes intense, the motor operates as a single-phase induction motor and the rotation continues.

Next in the electric motor shown in FIG. 4 a capacitor having a capacitance of 66 μF was employed as the resonant capacitor, and waveforms of the input voltage, input current, output voltage and output current as well as a Lissajous's figure representing the rotating magnetic field generated in the ring member 11' were observed. The waveforms and Lissajous's figures observed at the input voltages of 10 V, 20 V, 30 V, 40 V, 50 V, and 60 V and 70 V are illustrated at (A), (B), (C), (D), (E), (F) and (G), respectively, in FIG. 6. In the respective sections (A) to (G), (a) represents the input voltage waveform, (b) represents the input current waveform, (c) represents the output voltage waveform, (d) represents the output current waveform and (e) represents the Lissajous's figure.

Figure 6:
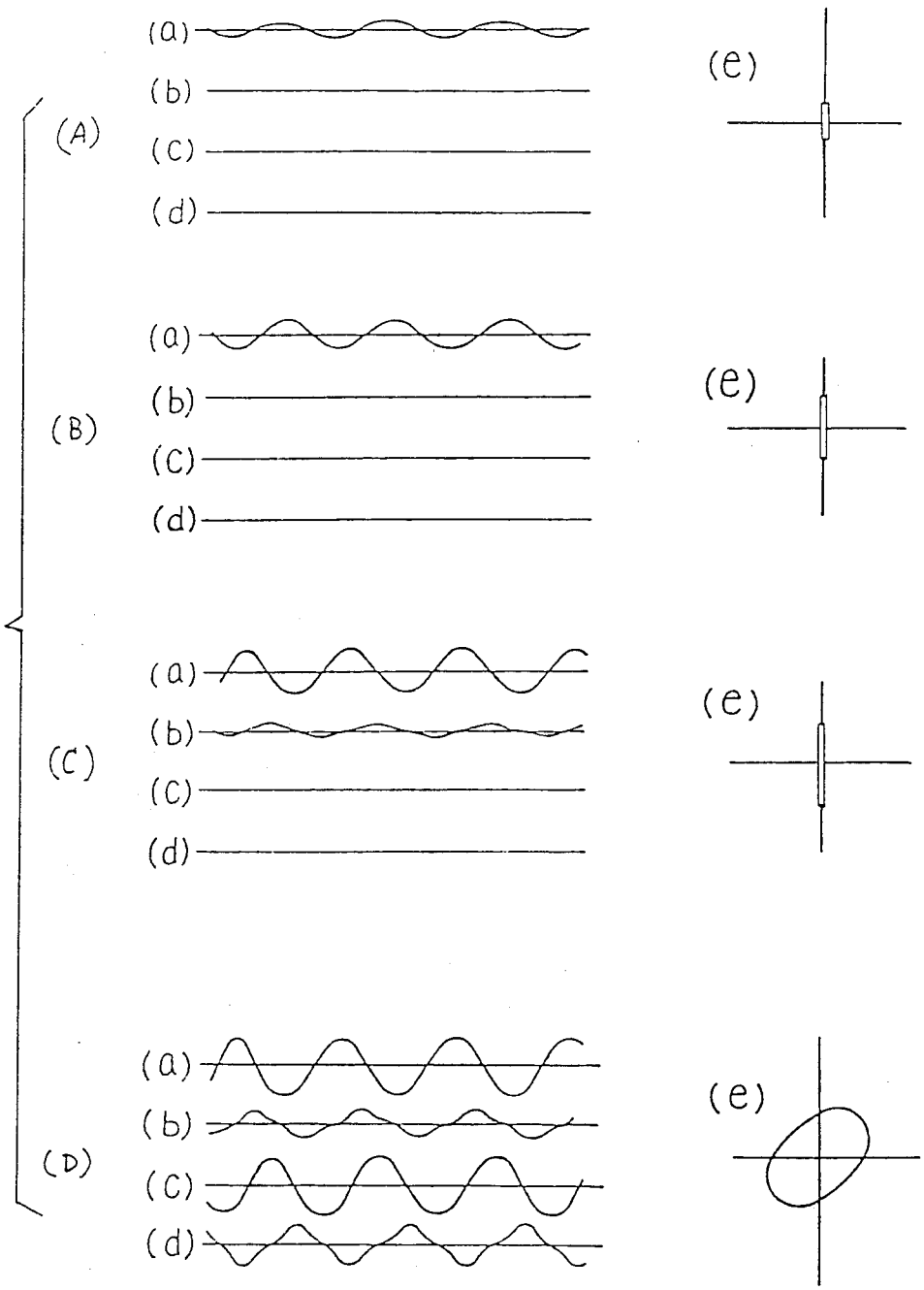
FIGS. 6(A) to 6(G) are diagrams showing an input voltage waveform (a), an input current waveform (b), an output voltage waveform (c), an output current waveform (d) and a Lissajous's figure representing a rotating magnetic field (d) for different input voltages with respect to the electric motor shown in FIG. 4.

From FIG. 6, it can be seen that when the input voltage is increased to 40 V or above, a circular rotating magnetic field is generated.

It is to be noted that in the electric motor used in these experiments, because of the fact that the bearings for the rotor 2' were not perfect and accompanied by a large frictional loss, substantially heavy load was applied to the motor and, consequently, the rotational speed of the rotor 2' was 1350 r.p.m. at the maximum which corresponded to a slip S of about 55%. However, the slip S could be improved to about 10% by improving the bearings and varying the resonant capacitor (16 in FIG. 1). The mode of improvement is illustrated in FIG. 7.

Figure 8:
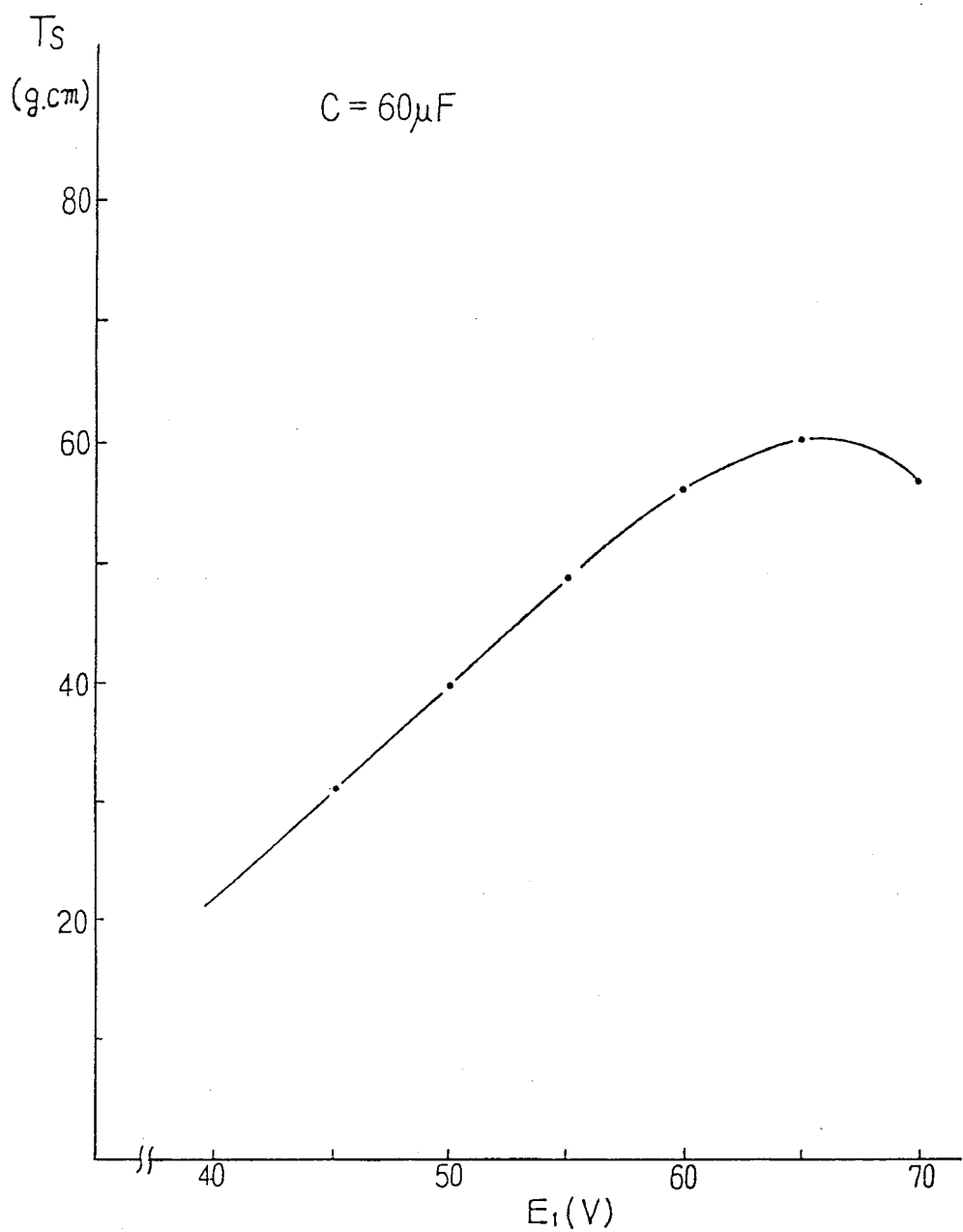
FIG. 8 is a diagram showing the relation between the input voltage and the starting torque.
Figure 9:
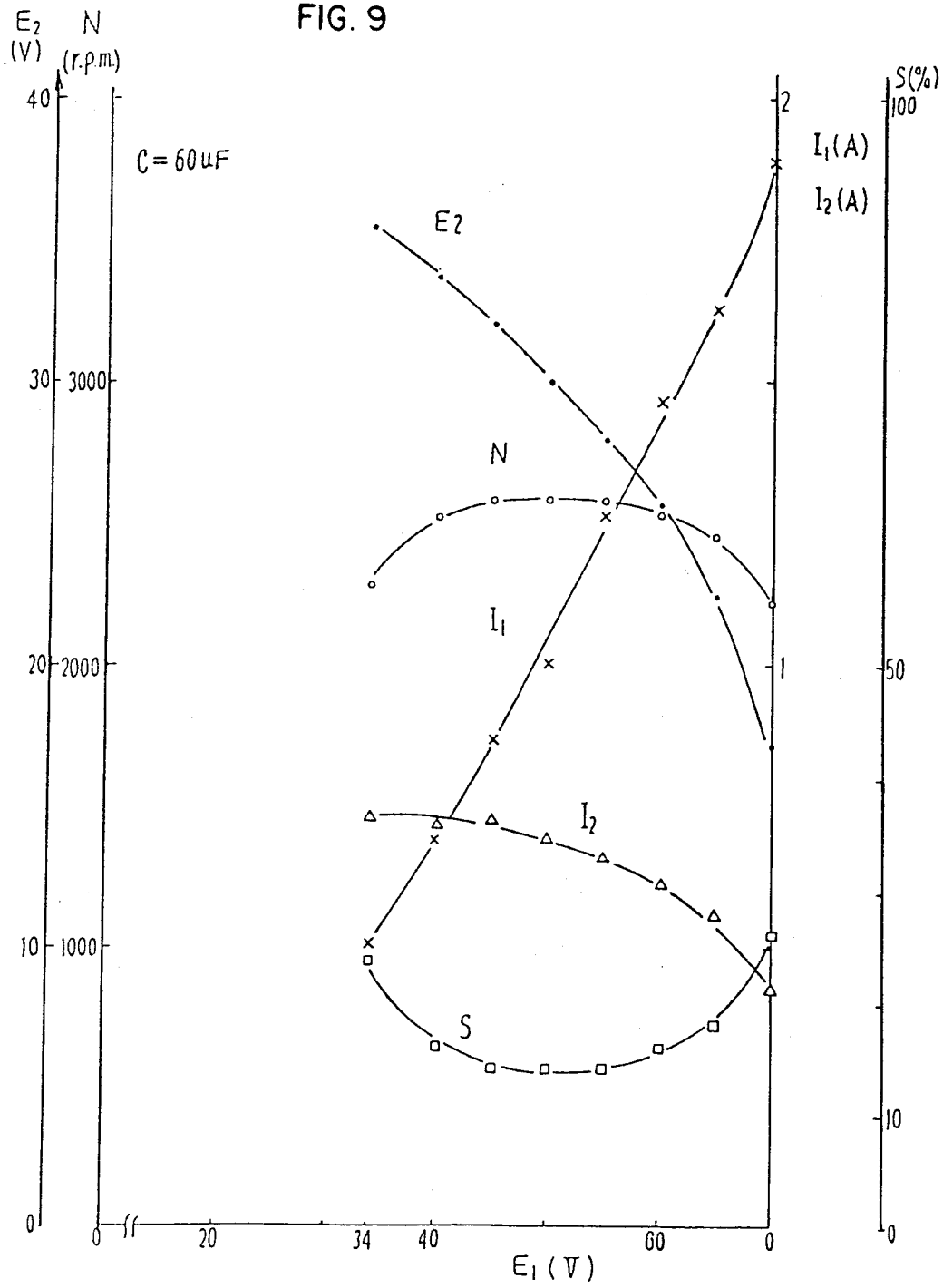
FIG. 9 is a diagram showing the relations under a fixed torque condition between the input voltage and the output voltage, rotational speed, input current, output current and slip.
Figure 10:
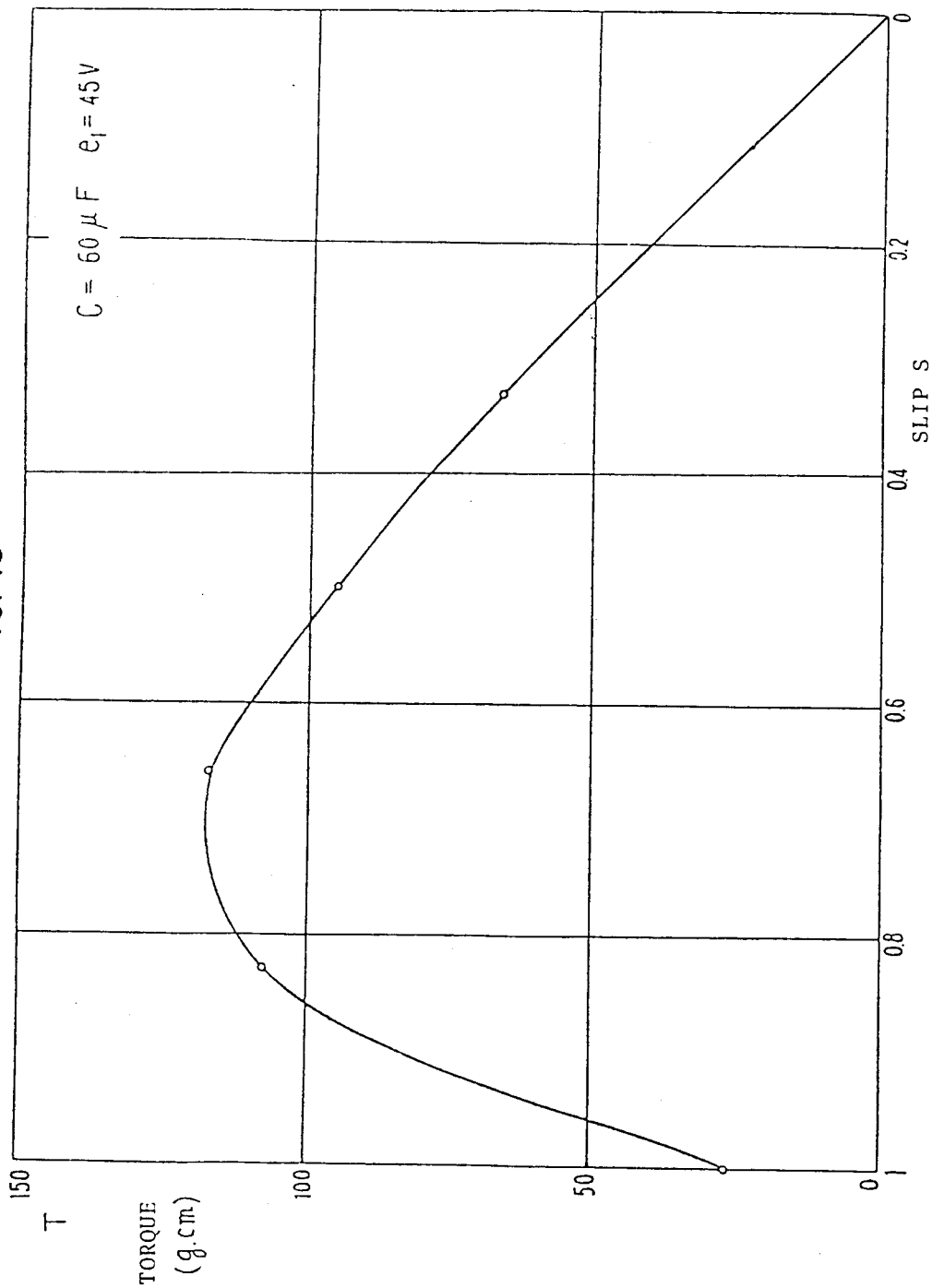
FIG. 10 is a diagram showing the slip-torque characteristics under a fixed input voltage condition.

Next in the A.C. electric motor shown in FIG. 4, a capacitor having a capacitance of 60 μF was used as the resonant capacitor, and the relation between the input voltage $E_1$ and a starting torque Ts as well as the relations under a fixed load condition between the input voltage $E_1$ and the output voltage $E_2$, rotational speed N, input and output currents $I_1$ and $I_2$ and slip S, respectively, were measured. The results are illustrated in FIGS. 8 and 9, respectively. It is seen from FIG. 9 that there exists a region where the rotational speed remains constant even if the power supply voltage $E_1$ should somewhat vary, provided that the load is kept constant. In addition, FIG. 10 shows slip-torque characteristics when the input voltage is 45 V.

Figure 11:
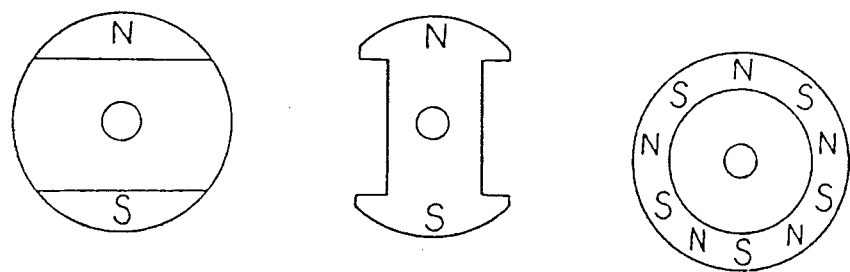
FIGS. 11(a) to 11(c) are schematic views showing three other examples of the rotor.

While a cage rotor was used as the rotor in the above-described embodiment, magnet rotors as shown in FIG. 11 which are used in a synchronous motor, could be used as the rotor. In this case, the rotor could be either a dipole rotor as shown at (a) or (b) or a multi-pole rotor as shown at (c).

Next description will be made as to other preferred embodiments employing a magnet rotor.

Figure 12:
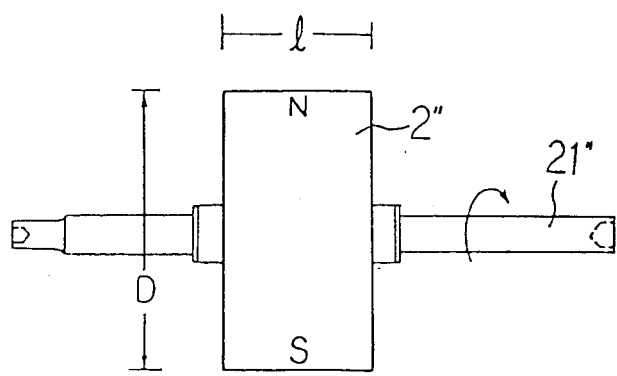
FIG. 12 is a side view showing a structure of a magnet rotor used in the embodiment 2.

Embodiment 2:

In the stator magnetic paths having parametric oscillation characteristics consisting of orthogonally crossed cores as used in Embodiment 1 (shown in FIG. 4), was assembled a magnet rotor 2" as shown in FIG. 12, and the assembly was operated. Regarding the material of the rotor then used, an Al-Ni-Co system magnet (TMK-4 material manufactured by Tohoku Metal Industries, Ltd.) having a diameter D=44.5 mm and a length l=25 mm was used, and the magnetization was dipole magnetization.

Figure 13:
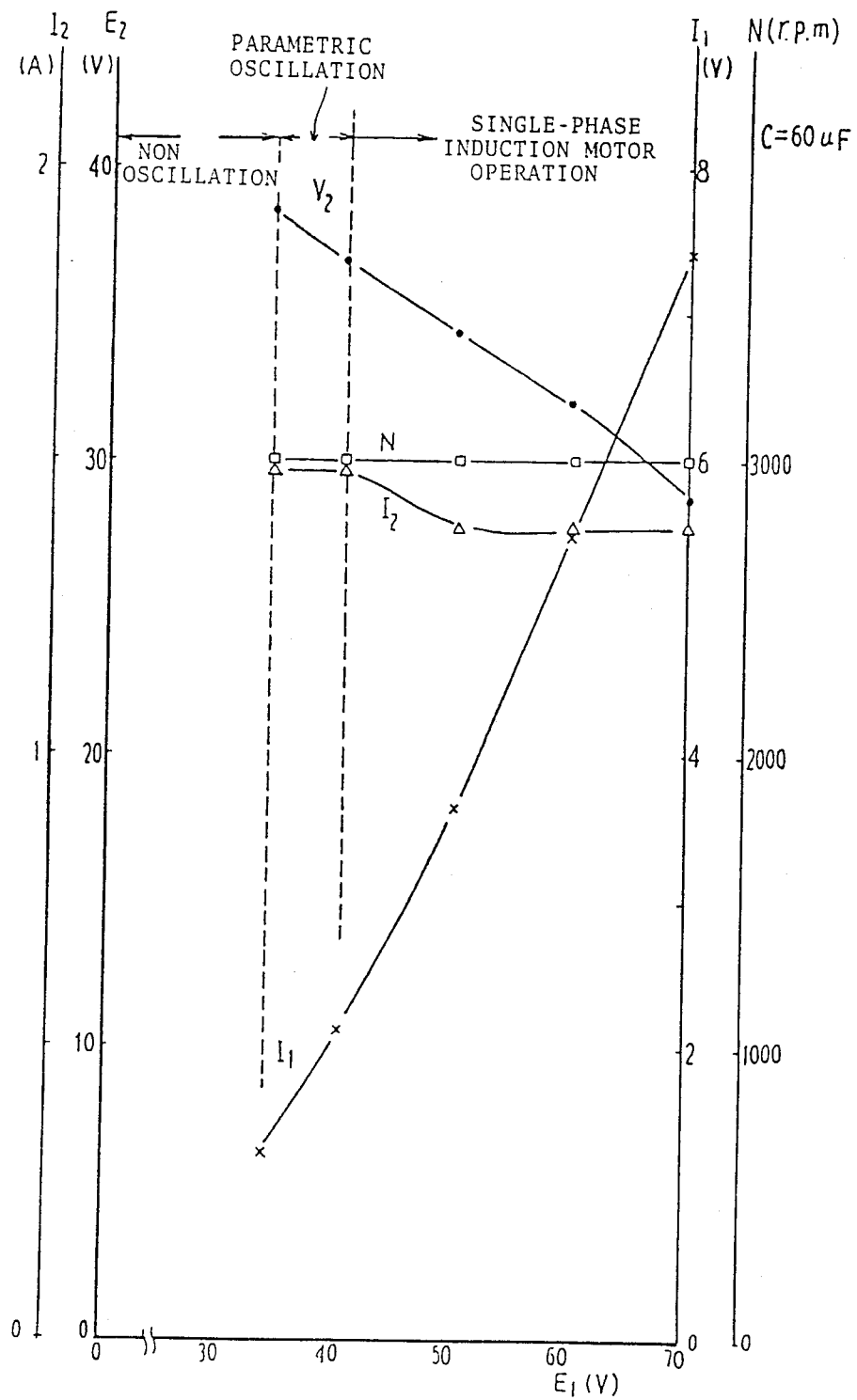
FIGS. 13 and 14 are diagrams showing the relations between the input voltage and the input current, output current, output voltage and rotational speed, with respect to two different capacitance values for the resonant capacitor in the embodiment 2 above.
Figure 14:
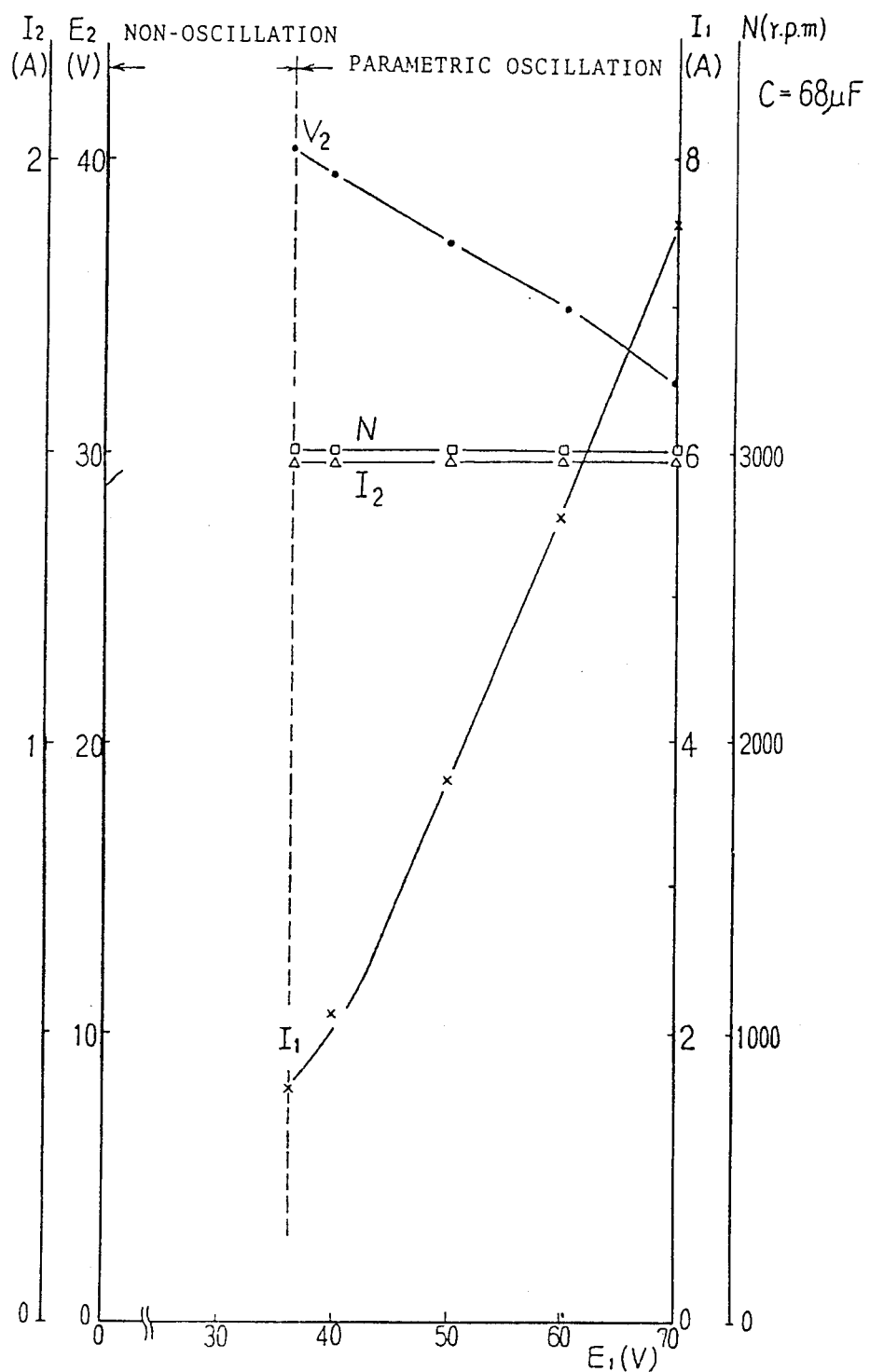

Then the no load characteristics, that is, the measured values of the input current $I_1$, output voltage $E_2$, output current $I_2$ and rotational speed N as functions of the input voltage $E_1$ are illustrated in FIGS. 13 and 14. FIG. 13 shows the characteristics when the resonant capacitor connected across the secondary winding has a capacitance C=60 μF, and FIG. 14 shows the characteristics when the resonant capacitor has a capacitance C=68 μF. From these results it is seen that the motor is operating as a synchronous motor.

In this case also, the rotor does not rotate at all in the non oscillation region, but when it enters the parametric oscillation region, that is, the circular rotating magnetic field region, it suddenly starts to rotate. $I_2$ and N take extremely stable values. As the input voltage is increased when the parametric oscillation ceases and an elliptic rotating magnetic field region results, a general synchronous motor characteristics region occurs and thus $I_2$ decreases. However, if an extremely favorable capacitance value is selected for the resonant capacitor, then parametric oscillation can be generated over a wide range of the input voltage $E_1$, and one example of such case is the case shown in FIG. 14.

Although it is known that as the input voltage $E_1$ is successively increased, once the rotor starts to rotate, it sustains rotation with the synchronous motor characteristics even if the secondary resonant capacitor is disconnected. It is also known that if the resonant capacitor is disconnected when the rotor is stationary, then the rotor cannot rotate at all to whatever extent the input voltage $E_1$ may be increased. However, at this moment, if a little torque is applied to the shaft of the rotor, then it suddenly starts to rotate. As a result, the resonant capacitor has the role of a starter.

While description was made as to the case where the magnetic yokes 12 and 13 are offset in angle by 90° from each other about the axis of the ring-shaped member 11, in the above-described respective embodiments, even if this offset in angle is not 90°, the apparatus must operate as an electric motor as long as an offset in angle exists, because the magnetic fluxes passing through the respective magnetic yokes would interlink in the ring-shaped member 11. However, it is considered that in the case where the offset in angle is not 90°, the motor characteristics would be somewhat degraded as compared to the case where it is 90°. On the basis of the above-mentioned consideration, the following experiments were conducted.

Figure 15:
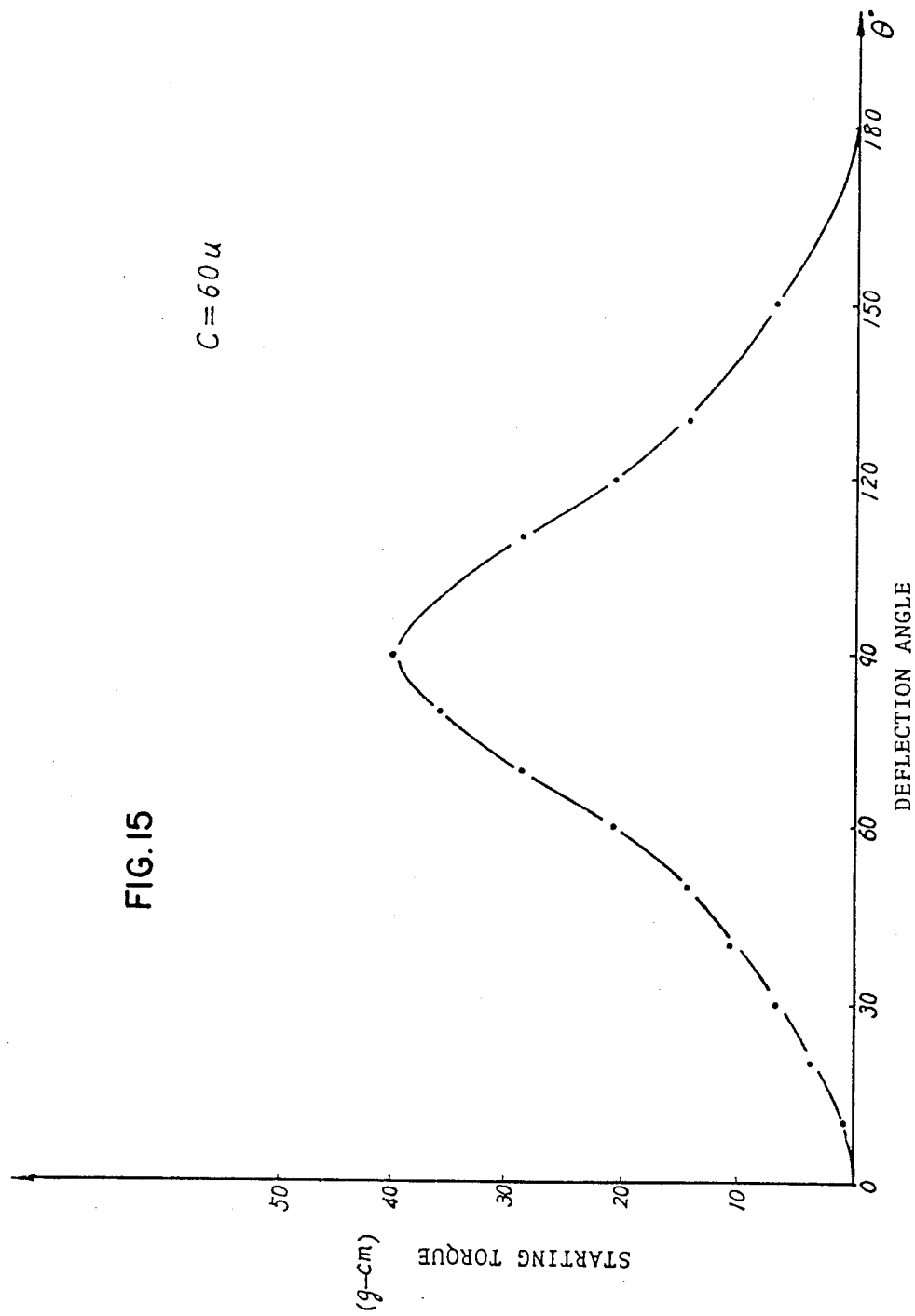
FIG. 15 is a diagram showing the relation between the deflection angle between the respective magnetic yokes and the starting torque in the embodiment 3.

Embodiment 3:

The A.C. electric motor used in Embodiment 1 was also used in this embodiment, the offset in angle θ between the first magnetic yoke 12' on the primary and the second magnetic yoke 13' on the secondary was varied in the range of 0° to 180°, and experiments were conducted in the region of parametric oscillation characteristics at the respective angles. The starting torque characteristics observed in these experiments are shown in FIG. 15. From this figure, it is seen that the maximum torque is obtained when the offset in angle θ is 90°, the torque decreases as it deviates from 90°, but so long as an offset in angle exists the motor can operate as an A.C. electric motor having parametric characteristics.

Embodiment 4:

In the structure of the electric motor shown in FIG. 4, a silicon steel plate (0.35 mm in thickness) wound in a ring shape was used as the ring-shaped member 11', commercially available cut cores (0.35 mm in thickness) made of Fe-Si series alloy was used as the magnetic yokes 12' and 13', and 500 turns of wire were used as the windings 14' and 15' around the respective yokes. A cage rotor for use in a single-phase induction motor was employed as the rotor 2'.

Figure 16:
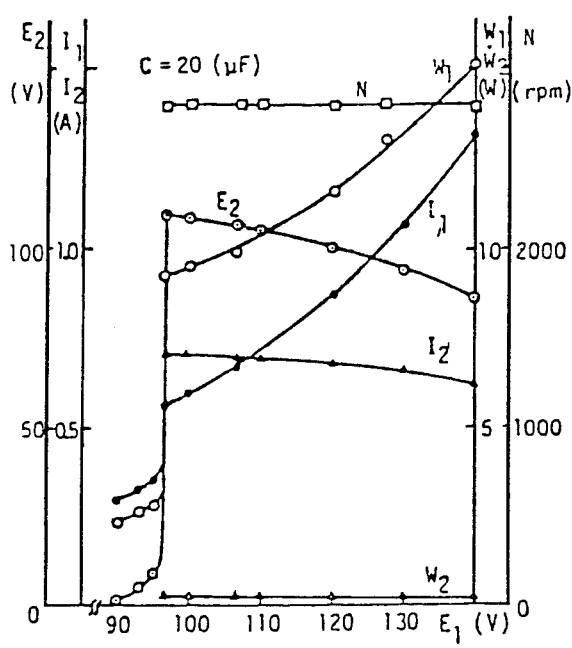
FIG. 16 shows no-load characteristic curves of the electric motor in the embodiment 4.

Experiments were conducted by making use of the above-described electric motor. FIG. 16 shows no-load characteristic curves of the experimental motor. In order to obtain an oscillation start voltage of about 100 V, a capacitor having a capacitance C=20 μF was used as the resonant capacitor (16 in FIG. 1).

With reference to FIG. 16, parametric oscillation starts at the input voltage $E_1 = 96.7$ V, then the primary current $I_1$ and the primary input power $W_1$ increase abruptly, and thereafter as the primary voltage $E_1$ increases, they also rise. On the side of the secondary winding also, at the same time as the start of oscillation the secondary current $I_2$ and the secondary voltage $E_2$ increase abruptly, and thereafter as the primary voltage $E_1$ increases, they decrease. In addition, the secondary power $W_2$ presents very small values. The rotor rotates simultaneously with the start of oscillation, and the rotational speed is N=2800 r.p.m.

Embodiment 5:

Next, for the purpose of investigating the influence of the magnetic ring member 11 serving as a common magnetic path upon the characteristics of the motor, in the motor used in Embodiment 4 three kinds of ring members as identified in the following table were prepared and interchangeably employed. For simplicity of consideration, the lengths and inner diameters of the three members were chosen to be equal to each other and only the outer diameters were varied.

| Ring Members | (I) | (II) | (III) |
| --- | --- | --- | --- |
| Inner Diameter (mm) | 47.7 | 47.7 | 47.7 |
| Outer Diameter (mm) | 67.7 | 64.7 | 60.9 |
| Length (mm) | 30.0 | 30.0 | 30.0 |

Figure 17:
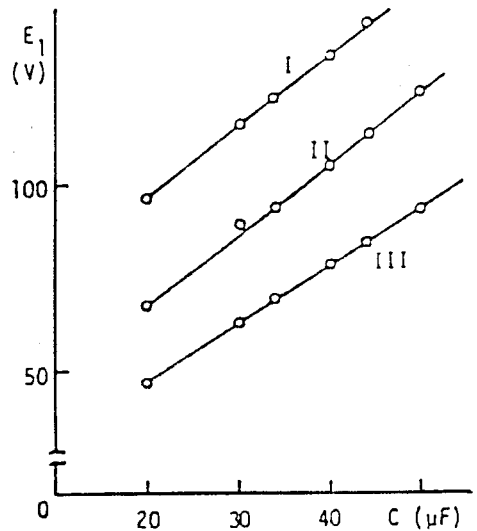
FIG. 17 is a diagram showing the relations between the capacitance of the resonant capacitor and the input voltage for three different ring members having different dimensions in the embodiment 5.

FIG. 17 shows the results of measurement for the relations between the input voltage $E_1$ upon start of oscillation and the capacitance C of the resonant capacitor as measured while the above-described common magnetic paths are interchangeably employed and the capacitance is varied. Referring to this figure, the input voltage $E_1$ upon start of oscillation rises linearly with the increase of the capacitance C. From this figure it is seen that when it is desired to select the input voltage $E_1$ upon start of oscillation of 100 V, the capacitance may be selected at C=20 μF in the case of the common magnetic path (I) or at C=36 μF in the case of the common magnetic path (II).

Figure 18:
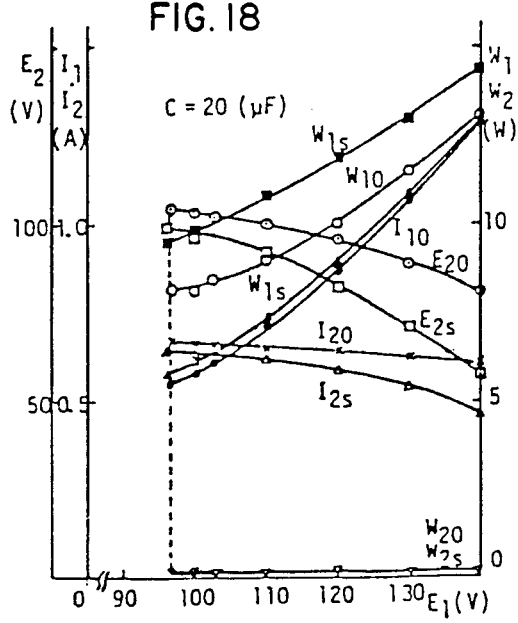
FIG. 18 is a diagram showing the results of the no-load test and the lock test in the embodiment 5.

Embodiment 6:

Next, in order to estimate the characteristics by means of an equivalent circuit, a no-load test and a lock test were carried out with respect to the motor employing the ring member (I) as referred to in Embodiment 5. The test results are illustrated in FIG. 18.

In the no-load test, in order to eliminate the influence of mechanical loss, the test motor was driven by another electric motor, and measurements were made at the rotational speed N=3000 r.p.m. The results of the no-load test are represented by adding a suffix "0". That is, $I_{10}$ and $W_{10}$ represent a current and power, respectively, on the primary input side, and $I_{20}$, $E_{20}$ and $W_{20}$ represent a current, voltage and power, respectively, on the secondary side where parametric oscillation is generated. Reviewing FIG. 18, the secondary power $W_{20}$ presents very small values.

The results of the lock test are also illustrated in the same figure. This was done for the sake of convenience, taking into consideration the convenience that since the impedance voltage of the motor was substantially equal to the no-load voltage the results of the lock test can be easily compared with the results of the no-load test. The results of the lock test are represented by adding a suffix "s". With reference to FIG. 18, it is seen that with regard to all the primary input power $W_{1s}$, primary current $I_{1s}$, the secondary voltage $E_{2s}$ and secondary current $I_{2s}$, the results of the lock test present the same tendency as the results of the no-load test. In addition, the secondary power $W_{2s}$ has very small values.

The resistances $r_1$ and $r_2$ of the windings 14' and 15', respectively, are as follows:

$r_1 = 2.9\Omega$ (the temperature upon $r_2 = 3.5\Omega$  measurement being 25° C.)

Figure 19:
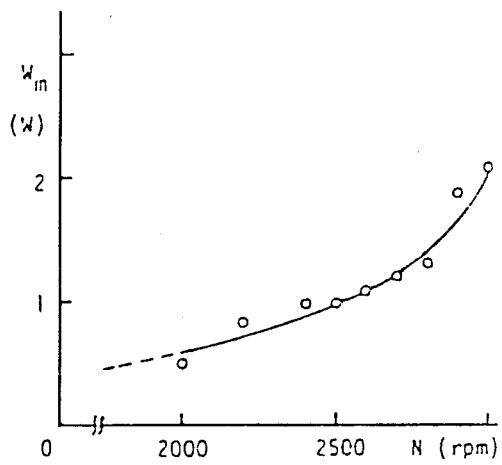
FIG. 19 is a diagram showing the relation between the mechanical loss and the rotational speed.

FIG. 19 shows the results of measurement for the relation between the mechanical loss and the rotational speed N (r.p.m.). Referring to this figure, although some fluctuations are acknowledged in the measured values, the mechanical loss Wm increases approximately in proportion to the square of the rotational speed, and the mechanical loss Wm=1W is observed at the rotational speed N=2500 r.p.m.

Figure 20:
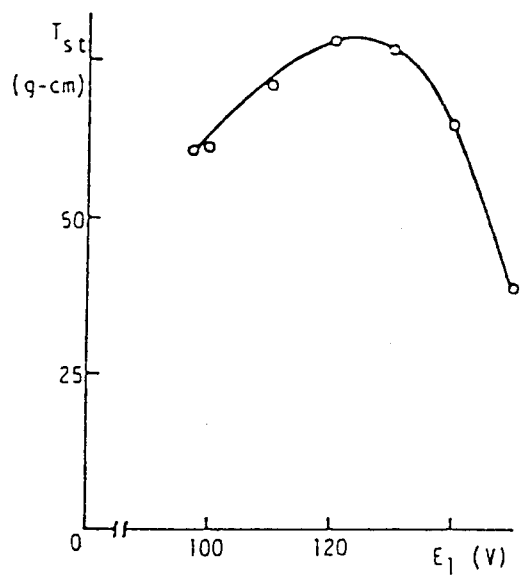
FIG. 20 is a diagram showing the relation between the primary voltage and the starting torque.

FIG. 20 shows the results of measurement of the relation between the primary voltage $E_1$ and the starting torque $T_{st}$. The starting torque $T_{st}$ takes the maximum value at the primary voltage $E_1 = 120$ V, and the maximum value is $T_{st} = 78$ g-cm.

Figure 21:
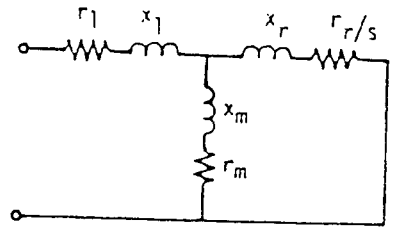
FIG. 21 shows an equivalent circuit of the electric motor according to the present invention.

As an equivalent circuit, an equivalent T-network for a symmetric two-phase induction machine as shown in FIG. 21 was employed, upon determination of the circuit constants the method was employed in which the resistance $r_r$ and the reactance $x_r$ of the rotor are separated by determining the ratio of the reactance $x_r$ to the resistance $r_r$, that is, $k = x_r/r_r$, and moreover, investigation was also made on the method in which the leakage reactance of the stator is actually measured and thereby the circuit constants are determined.

Figure 22:
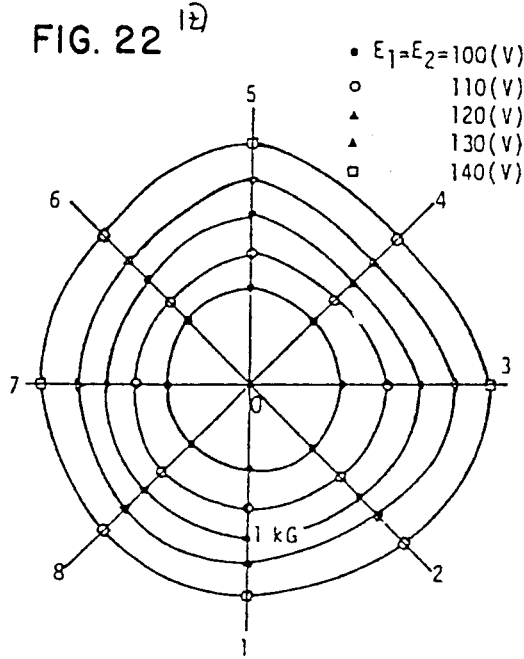
FIG. 22 is a diagram showing a gap magnetic flux during no-load operation.

FIG. 22 shows the results of measurement of a gap magnetic flux during no-load operation. The magnetic flux was measured by means of eight search coils disposed at equal intervals along the inside of the common magnetic path. In order to satisfy the condition of the two-phase induction motor, magnetic excitation was made by applying respective voltages which are equal in magnitude but different in phase by 90° from separate power supplies. With reference to FIG. 22, the gap magnetic flux is approximately of circular shape, and hence it is seen that the magnetic flux is substantially uniformly distributed within the gap. When the primary and secondary voltages are $E_1 = E_2 = 100$ V, a magnetic flux density of B=600 gausses was obtained.

Figure 23:
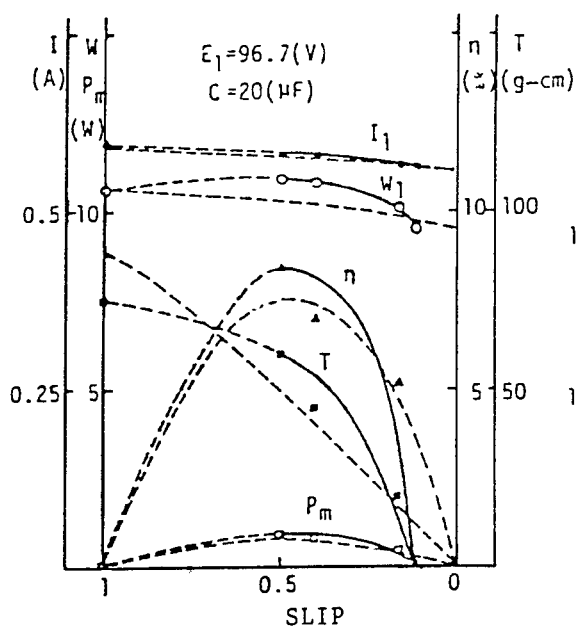
FIG. 23 shows loading characteristic curves in the embodiment 5.

In FIG. 23 are shown loading characteristic curves measured at a fixed primary voltage $E_1=96.7$ V=constant in the case where the capacitance of the capacitor $C=20$ μF is selected. In this figure, solid lines represent measured values, whereas dash lines represent calculated values which were estimated from the equivalent circuit in FIG. 21. With reference to this figure, it is seen that with respect to the primary current $I_1$ and the primary input power $W_1$ the measured values fairly well coincide with the calculated values, but considerable errors exist between the measured values and the calculated values of the torque T. Consequently, the errors are also large with respect to the output $P_m$ and the efficiency η. However, since they are relatively coincident in their general tendencies, it is believed that the equivalent circuit shown in FIG. 21 is available provided that the circuit conditions are preset so as to fulfil the condition of $E_1=E_2$.

In addition, it is observed that the torque curve takes the maximum value upon starting and it decreases as the slip S is reduced, and this is considered to be due to the fact that the resistance of the rotor as used has a very large value.

Figure 24:
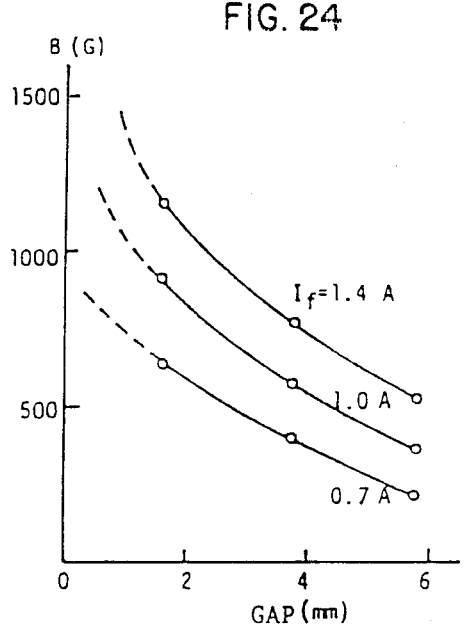
FIG. 24 is a diagram showing the relations between the gap length and the gap magnetic flux density.

Now, investigation will be made on the values of the output power and efficiency. With reference to FIG. 23, they present very small values such as $P_m=0.7W$ and η=about 7%, and this is due to the fact that the gap magnetic flux is small. More particularly, in the experimental motor, for the purpose of measuring the gap magnetic flux, the gap length is selected at a relatively large value of $g=1.6$ mm. Consequently, the gap magnetic flux density takes a very small value of $B=600$ Gausses ($I_f=0.7$ A) as shown in FIG. 24. If the gap magnetic flux density is increased up to the value employed in the conventional motors such as several Kilo-Gausses by reducing the gap length and increasing the excitation ampere-turns, then since the torque is proportional to the square of the gap magnetic flux, it is possible to widely improve both the output power and the efficiency.

The present invention has been described above in connection to its preferred embodiments. Now the characteristic advantages of the present invention will be enumerated in the followings:

(1) When the rotor is rotating under the parametric oscillation, the motor possesses a filtering function similarly to the case where a parametric transformer is used, and hence there is no need to use a special power supply.

(2) The windings can be separately wound around the first and second magnetic yokes, respectively, and one can spare the complexed process of providing slots on the gap sides of both the stator and the rotor and mounting conductors in these slots as insulated therefrom as is the case with the conventional electric motors. Hence the assembling work is very simple. In addition, since unevenness of the magnetic field is not produced, there exists little unevenness in rotation.

(3) Upon parametric oscillation, if the input voltage and the output voltge are made equal, an approximately circular rotating magnetic field can be obtained. Whereas, in the single-phase induction motor it is difficult to obtain a circular rotating magnetic field by making use of an inductor or a capacitor, and so, the motor according to the present invention is superior to the prior art motor.

(4) Even if the parametric oscillation should cease, the motor would continue to rotate as an induction motor or a synchronous motor.

(5) Provided that the load is kept constant, there exists an operating region where the rotational speed can be maintained constant even if the power supply voltage should somewhat vary.

(6) Not only a motor operated by a commercial power supply, but also an electric motor for operating at a high frequency such as 1 KHz can be realized.

(7) Regardless of whether the motor is large or small in size, the manufacture of the motor is easy.

What is claimed is:

1. A method of developing AC motor output comprising; forming a continuous annular flux by a stationary continuous magnetic ring;
rotating a rotor within said magnetic ring under the effect of parametric oscillation caused by interaction of two further induced fluxes in said ring which form a resultant rotating annular flux; and
producing said parametric oscillation by applying AC voltage to a primary winding wound on a first U-shaped magnetic member connected to said ring and extending axially therefrom in one direction, said U-shaped member and continuous magnetic ring forming a first continuous magnetic circuit, inducing one of said further fluxes in said magnetic circuit upon application of said AC voltage to said primary winding and inducing the other of said further fluxes in said ring through a second U-shaped magnetic circuit formed by a second U-shaped magnetic member connected to said ring and extending axially therefrom opposite said one direction and a secondary winding wound on the second U-shaped magnetic member and connected to a capacitor to cause voltage induced in the secondary winding to be out of phase with the applied A.C. voltage.

2. A method as claimed in claim 1, wherein the secondary voltage and A.C. voltage are substantially equal.

3. A method as claimed in claim 1 wherein the secondary voltage and A.C. voltage are out of phase by 90°.

4. A method as claimed in claim 1 wherein a continuous gap is formed between the rotor and the surrounding magnetic ring for forming said continuous annular flux.

5. A method as claimed in claim 4 wherein said stationary continuous magnetic ring is formed cylindrically to surround said rotor with said continuous gap and provide a uniform radial extent in which said resultant flux rotates.

* * * * *